E. J. R. BEATTEY.
OPHTHALMIC LENS FRAME.
APPLICATION FILED SEPT. 16, 1919.
1,344,474.
Patented June 22, 1920.
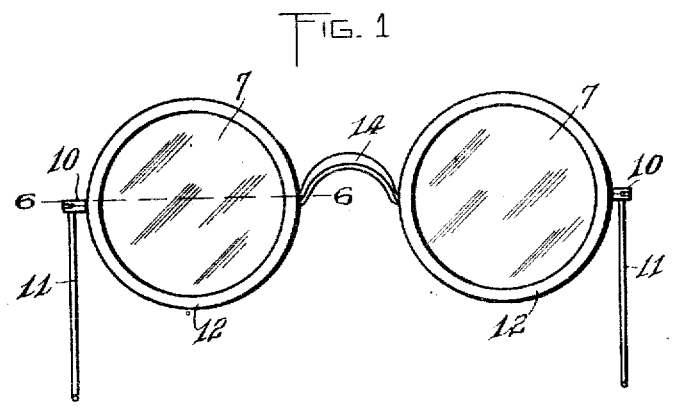
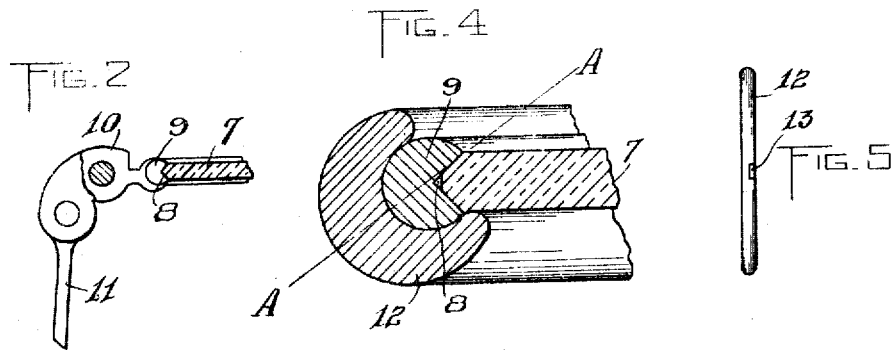
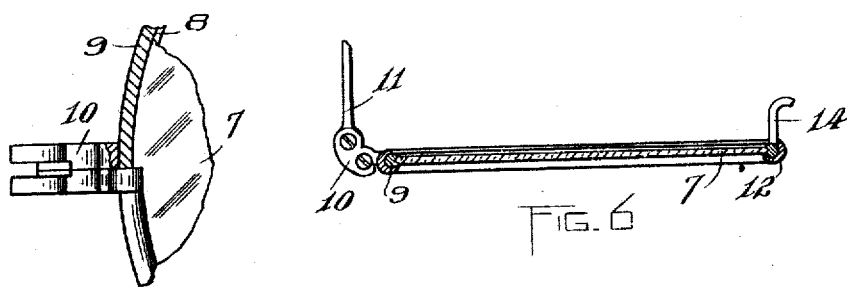
INVENTOR
Earle J. R. Beattey
BY
Davis
his ATTORNEY

UNITED STATES PATENT OFFICE.

EARLE J. R. BEATTEY, OF PROVIDENCE, RHODE ISLAND, ASSIGNOR TO UNIVERSAL OPTICAL CORPORATION, OF PROVIDENCE, RHODE ISLAND, A CORPORATION.

OPHTHALMIC-LENS FRAME.

1,344,474. Specification of Letters Patent. Patented June 22, 1920.

Application filed September 16, 1919. Serial No. 324,095.

*To all whom it may concern:*

Be it known that I, EARLE J. R. BEATTEY, a citizen of the United States, and resident of Providence, in the county of Providence and State of Rhode Island, have invented certain new and useful Improvements in Ophthalmic-Lens Frames, of which the following is a specification.

The present invention relates to ophthalmic lens frames and more particularly to the type in which the lens is mounted within a metallic inner rim surrounded by an outer rim formed of non-metallic material such as zylonite or celluloid, an object of this invention being to provide a simple and inexpensive construction whereby the outer rim may be effectively secured to the inner rim.

To this and other ends, the invention consists of certain parts and combinations of parts, all of which will be hereinafter described, the novel features being pointed out in the appended claims.

In the drawings:

Figure 1 is a front view of a pair of spectacles embodying the present invention;

Fig. 2 is a detail view showing the manner in which the temples are secured to the metallic frame;

Fig. 3 is a fragmentary view showing the metallic frame and the connection of the terminals or temple securing ends thereto;

Fig. 4 is an enlarged section through the frame;

Fig. 5 is a detail view of the non-metallic rim showing the latter in side elevation; and Fig. 6 is an enlarged section on the line 6—6, Fig. 1.

Referring more particularly to the drawings 7 indicates the lenses which are received at their edges within grooves 8 formed in the inner peripheries of the metallic rims 9, these metallic rims being split and having terminals 10 soldered or otherwise secured thereto at the split for the reception between them of the temples 11 in the usual manner. The metallic frame has a circular cross section except for the portion in which the lens receiving groove 8 is formed.

The feature of this invention is the manner in which the metallic rim is held in the non-metallic rim 12, the latter being formed preferably of zylonite, celluloid or the like and being continuous. This is obtained by a specially formed groove in the outer rim in which the inner metallic rim is received. This groove facilitates the fitting of the outer rim on the inner rim and at the same time permits the outer rim to cover the inner rim on the front face thereof so that the frame from the front appears to be entirely of non-metallic material. The groove is so formed that a transverse line A—A intersecting the center and bottom of the groove at its greatest depth lies out of the plane of a lens held by the rim and at an angle other than a right angle to such plane. In this way the forward wall of the groove conforms to and covers the front face of the metallic rim and projects nearer the center of the rim than the rear wall of the groove so that the rear face of the metallic rim is partially exposed. By this arrangement the metallic rim may be forced into the groove of the non-metallic rim, the rear wall of the non-metallic rim expanding to permit the insertion. After the metallic rim enters the groove the non-metallic rim is held to the metallic rim and the front wall of the groove of the non-metallic rim closely hugs and covers the front face of the metallic rim. If desired each non-metallic rim may be provided with a notch 13 in its rear face in which the temple ends may be received and the bridge 14 may connect directly with the metallic rims 9 at points within the non-metallic rims.

From the foregoing it will be seen that there has been provided an ophthalmic lens frame embodying an inner metallic rim with a lens receiving groove surrounded by a continuous non-metallic rim which is provided with a groove so formed that a transverse line intersecting the groove at its center and its greatest depth, lies out of the plane of a lens held by the rim at an angle other than the right angle to such plane, thus making the forward wall of the groove conform to the front wall of the metallic rim and closely hugging such rim, said front wall projecting inwardly beyond the rear wall so that the rear portion of the metallic rim is partially exposed to permit the non-metallic rim to be readily fitted to and removed from the metallic rim. The removal may be accomplished by inserting a sharp device between the metallic rim and the non-metallic rim at the rear of the lens and exerting a slight pressure to force the non-metallic rim off the metallic rim.

What I claim as my invention and desire to secure by Letters Patent is:

1. An ophthalmic lens frame comprising an inner metallic rim formed with a lens receiving groove and a continuous outer non-metallic rim having a groove so formed that a transverse line intersecting the center and bottom of the groove at its greatest depth lies out of the plane of a lens held by said metallic rim at an angle other than a right angle to such plane.

2. An ophthalmic lens frame comprising an inner rim formed with a lens receiving groove and a continuous outer non-metallic rim having a groove, the forward wall of which has its inner face curved to conform to and covers the front face of the metallic rim, said front wall projecting nearer to the center of the rim than the rear wall so that the rear face of the metallic rim is partially exposed.

EARLE J. R. BEATTEY.